United States Patent
Blaukovitsch et al.

(12) 
(10) Patent No.: US 7,680,023 B2
(45) Date of Patent: Mar. 16, 2010

(54) RECORD MEDIUM WITH DIFFERENT LATENCIES

(75) Inventors: Reinhard Blaukovitsch, Elixhausen (AT); Andreas Winter, Altenmarkt (AT); Peter Meerwald, Elsbethen (AT); Harald Gabl, Linz (AT)

(73) Assignee: Sony DADC Austria AG, Anif (AT)

( * ) Notice: Subject to any disclaimer, the term of this patent is extended or adjusted under 35 U.S.C. 154(b) by 973 days.

(21) Appl. No.: 10/473,112

(22) PCT Filed: Dec. 19, 2002

(86) PCT No.: PCT/EP02/14587

§ 371 (c)(1),
(2), (4) Date: Oct. 12, 2004

(87) PCT Pub. No.: WO03/054878

PCT Pub. Date: Jul. 3, 2003

(65) Prior Publication Data

US 2005/0063255 A1    Mar. 24, 2005

(30) Foreign Application Priority Data

Dec. 21, 2001    (EP) .................................. 01130688

(51) Int. Cl.
*G11B 7/24* (2006.01)
(52) U.S. Cl. ................................. 369/275.4; 369/53.21
(58) Field of Classification Search ............... 369/275.3, 369/275.2, 275.4

See application file for complete search history.

(56) References Cited

U.S. PATENT DOCUMENTS

| | | | | |
|---|---|---|---|---|
| 5,070,474 A | * | 12/1991 | Tuma et al. | 703/24 |
| 5,530,751 A | | 6/1996 | Morris | |
| 5,572,507 A | * | 11/1996 | Ozaki et al. | 369/53.21 |
| 5,608,718 A | * | 3/1997 | Schiewe | 369/275.4 |
| 5,696,757 A | * | 12/1997 | Ozaki et al. | 369/47.35 |
| 5,949,749 A | * | 9/1999 | Muramatsu et al. | 369/59.11 |
| 5,963,521 A | | 10/1999 | Nagashima et al. | |
| 6,108,296 A | * | 8/2000 | Kajiyama et al. | 369/275.4 |
| 6,185,664 B1 | | 2/2001 | Jeddeloh | |
| 6,493,293 B1 | * | 12/2002 | Gallery et al. | 369/30.27 |
| 6,507,557 B1 | * | 1/2003 | Ohno et al. | 369/275.3 |
| 7,099,258 B2 | * | 8/2006 | Sako et al. | 369/100 |

(Continued)

FOREIGN PATENT DOCUMENTS

EP    0 987 705 B1    3/2000

(Continued)

*Primary Examiner*—Tan X Dinh
(74) *Attorney, Agent, or Firm*—Oblon, Spivak, McClelland, Maier & Neustadt, L.L.P.

(57) ABSTRACT

Latency information is used for coding of additional information in a record medium. This additional information which gets embossed in the record medium might be used for verification purposes in that only storage media with the correct latency information are judged to be authentic or might be decoded in a proper way. This technique is applicable to record media, recordable record media, an emulator for recordable or non-recordable record media, a method for producing recordable or non-recordable record media, a method for verifying recordable or non-recordable record media, a record medium writing device for producing recordable or non-recordable record media, and a record medium accessing device for verifying recordable or non-recordable record media.

12 Claims, 11 Drawing Sheets

Figure 1:
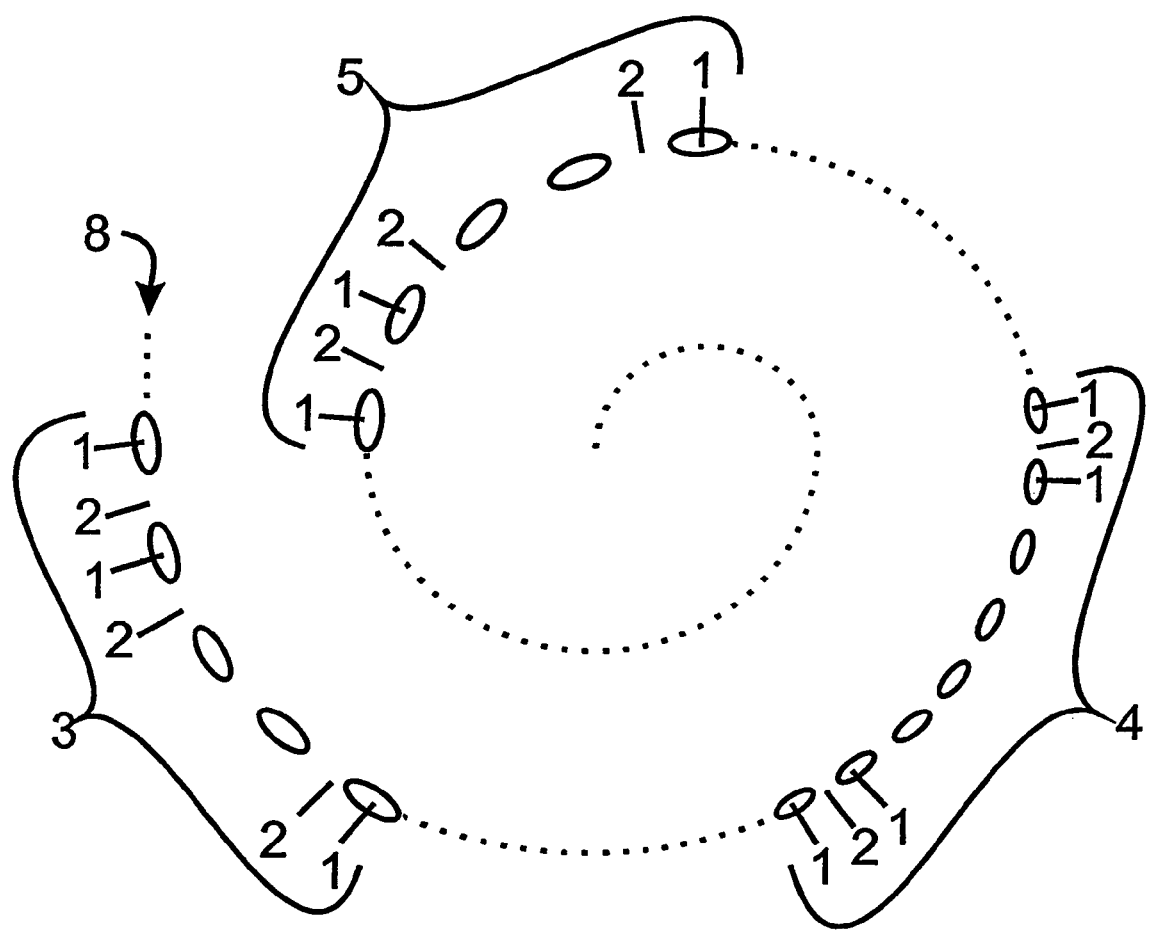

U.S. PATENT DOCUMENTS 7,231,731 B2 * 6/2007 Muramatsu et al. ...... 369/275.3
2006/0153052 A1 * 7/2006 Meerwald et al. ........ 369/275.1

FOREIGN PATENT DOCUMENTS

| | | |
|---|---|---|
| JP | 07-249227 A | 9/1995 |
| JP | 07-296493 A | 11/1995 |
| JP | 08-036803 A | 2/1996 |
| JP | 08-212681 A | 8/1996 |
| JP | 11-039796 A | 2/1999 |
| JP | 2001-135021 A | 5/2001 |
| JP | 2001-184654 A | 7/2001 |
| JP | 2001-296863 A | 10/2001 |
| JP | 2001-319334 A | 11/2001 |
| JP | 2001-344764 A | 12/2001 |
| WO | 97/45836 | 12/1997 |

* cited by examiner

RECORD MEDIUM WITH DIFFERENT LATENCIES

The present invention relates to a copy protection method for record media, e.g. storage media or record carriers. In particular the present invention relates to a copy protection and to a copy control mechanism by authentication of record carriers.

Such record carriers might store digital data as an asynchronous signal, e.g. Compact Discs (CDs) and Digital Versatile Discs (DVDs) including all existing or future formats of CD and DVD or other Optical Storage Media which work according to a similar concept. Also, recordable record carriers like CD-R or DVD-R might be copy-protected according to the present invention.

Optical storage discs with information stored on one or both sides and/or in several layers have come to be used for a variety of purposes, most notably in the music, games, video and computer industry. Digital information is stored on the optical storage media in the form of pits arranged along helical track(s) on one or on both sides of the disc and/or in several layers. Each track is typically read from the inside out, but may also be read form outside in, as it is already used for some optical storage media. Magnetic storage media, on the other hand, normally comprise circular, concentric tracks.

The data itself on the track is subdivided into storage blocks, i.e. frames, each equal in length, containing equal amounts of information. Each frame has a dedicated layout depending on the type of optical storage media (CD, DVD). Such a frame always contains the user data symbols itself but also data for synchronization, merging data between data symbols and error correction.

As mentioned above, the signal on such an optical record carrier itself is asynchronous, which means that in the decoding process synchronization and timing information has to be spied out from the signal.

Due to the nature of such record carriers copies can be made easily. To cope with this situation, there exist various copy protection schemes which prevent unauthorized access with the help of keys or passwords stored on the respective record carrier itself. Further, there exist methods which secure an optical disc with the help of stored invalid information which gets repaired during the copy process so that an application program can determine whether it is stored on an original or on a copy based on the presence or absence of this invalid information. One example of such an optical disc copy management system is disclosed in EP 0 899 733 of the applicant which content is herewith included into the specification by reference.

The format in which audio information is stored on a CD is known as the "Red Book" standard. The so called "Yellow Book" standard is typically as a format for a CD-ROM. The Yellow Book format is similar to the Red Book format in many respects, but replacing the audio information by computer data. Besides the Red Book and Yellow Book standard there exist many more standards developed for optical storage media covering audio data, computer data, video data and combinations of these information.

Further storage media which are applicable to the present invention should be semiconductor memories which comprise a plurality of single memory cells, like RAM or ROM memories. An advantageous application of a copy protection management system for such memories lies in particular in the field of chip cards which are equipped with RAM or ROM memories or any removable memory cards, e.g. the Sony Memory Stick™.

Therefore, it is an object underlying the present invention to provide a new copy protection system, i.e. a record medium which allows a new copy protection, a recordable record medium which supports the new copy protection, an emulator for a recordable or non-recordable record medium which supports the new copy protection, a method for producing a recordable or non-recordable record medium which allows the new copy protection, a method for verifying a recordable or non-recordable record medium which shows the new copy protection, a record medium writing device for producing a recordable or non-recordable record medium which shows the new copy protection, and a record medium accessing device for verifying a recordable or non-recordable record medium which shows the new copy protection.

The central feature of the present invention is the usage of latency information for coding of additional information in a record medium. This additional information which gets embossed in the record medium might be used for verification purposes in that only storage media with the correct latency information are judged to be authentic or might be decoded in a proper way.

According to the present invention latency is the waiting time from the request of data to the receiving of the requested data, e.g. the access time in case of a record medium which is accessed with the help of mechanical devices and/or the transfer time in case of semiconductor memories.

The latency of predetermined storage areas might be changed e.g. by altering the line speed of optical, magnetic or magneto-optical storage media (line speed modulation) so that an achieved latency and synchronization properties should still be within a specification so that all accessing devices working according to the specification should be able to access the respective storage medium without problems, but is changed to be recognizable different to the corresponding latency normally used.

Of course, also changes to values out of the specification are possible in case it is accepted that not all devices can access the respective modified storage medium or the storage medium is particularly designed for a special accessing device or a special type of accessing devices which can access the storage medium which is modified so that an achieved latency and synchronization properties are out of the corresponding specification.

Further, the latency of semiconductor memory cells might be changed by delaying certain memory cells or different latencies might be achieved by arranging memory cells with different latencies to one memory unit.

In case the record medium according to the present invention is copied, the content is stored in a 1:1 manner, but the record medium carrying the copied content most likely shows different latencies than the original record medium according to the present invention and therefore is clearly distinguishable and recognizable as a copy. It is also possible that the data on the record medium is encrypted with a key which is stored on the record medium on basis of different latencies. In this case the data cannot be decrypted with a copied record medium showing a latency characteristic different to that of the original record medium according to the present invention.

The record medium comprising different storage areas with respective corresponding latencies according to the present invention shows the characteristic that a respective latency of at least one part of said different storage areas is altered in respect to said respective corresponding latency, or storage areas with different corresponding latencies are arranged in a predetermined pattern on said record medium, which pattern is irregular with respect to the type of record medium.

Therewith, the record medium according to the present invention might generally show one of the above two possibilities, namely an alteration of latencies in one or more storage areas in respect to normally used latencies, e.g. on basis of a change of the normally used line speed with which data is recorded on an rotating recording medium, or an arrangement of storage areas with different latencies in an irregular pattern in respect to a normally used pattern, e.g. by using one or more slower or faster memory cells in a semiconductor memory which normally only has memory cells with one latency. Generally, the record medium according to the present invention might be a read-only record medium, or a recordable or rewriteable record medium.

According to a first preferred embodiment of the record medium according to the present invention said record medium is preferably a semiconductor memory or a hard disk comprising a predetermined number of memory cells as said storage areas, wherein said corresponding latencies are determined based on a possible access speed of said memory cells and said altered latencies are shorter or longer latencies than said corresponding latencies.

Further preferably, according to the first preferred embodiment of the record medium according to the present invention said longer latencies are achieved by delaying the output of a corresponding memory cell.

Alternatively or additionally, according to the first preferred embodiment of the record medium according to the present invention said semiconductor memory is preferably integrated in a chip card or any other comparable existing or future storage medium.

As also indicated above, by forming a memory unit of memory cells with different latencies, an individual authentication of the memory is possible on basis of an individual arrangement of the respective memory cells. With this feature it is not only possible to copy protect or to verify data stored on/in such a record medium, but also to use the record medium itself for authentication, e.g. similar to or as a dongle.

According to a second preferred embodiment of the record medium according to the present invention said record medium is preferably an optical or a magneto-optical record carrier comprising a predetermined number of memory blocks as said storage areas, wherein said corresponding latencies are determined based on a density of bits written in said memory blocks and said altered latencies of said at least one part of said memory blocks are shorter or longer latencies than said corresponding latencies.

Further preferably, according to the second preferred embodiment of the record medium according to the present invention said shorter and longer latencies are achieved on basis of line speed variations.

Alternatively or additionally, according to the second preferred embodiment of the record medium according to the present invention said shorter latencies are achieved by writing the bits within a corresponding memory blocks in a higher density and longer latencies are achieved by writing the bits within a corresponding memory blocks in a lower density.

Further alternatively or additionally, according to the second preferred embodiment of the record medium according to the present invention said optical or a magneto-optical record carrier is a read-only record carrier, or a recordable or rewriteable record carrier, e.g. CD, a CD-R, a DVD, a DVD-R or any other comparable existing or future storage medium.

The recordable or rewriteable record medium according to a further aspect of the present invention comprises a pre-formatted recording density information or latency information indicating storage areas with different latencies or recording densities which are arranged in a predetermined pattern on said record medium, which pattern is irregular with respect to the type of record medium.

The pre-formatted recording density information might e.g. be storage areas or memory cells with different latencies into which data can be recorded (for the first preferred embodiment according to the present invention) or might e.g. be the pre-grove information of an optical record medium, e.g. a CD-R, or comparable information, according to which the recording density is chosen during recording of data onto the record medium (for the second preferred embodiment according to the present invention).

Preferably, in the recordable or rewriteable record medium according to the further aspect of the present invention said pre-formatted recording density information or latency information is a frequency information written to the pre-grove of the record medium.

Further preferably, the recordable or rewriteable record medium according to the further aspect of the present invention shows the features of a record medium according to the present invention as indicated above.

The emulator for a record medium comprising different storage areas with respective corresponding latencies according to the present invention emulates a respective latency of said different storage areas so that a respective latency of at least one part of said different storage areas is emulated to be altered in respect to said respective corresponding latency, or storage areas with different corresponding latencies are emulated to be arranged in a predetermined pattern on said record medium, which pattern is irregular with respect to the type of record medium.

Preferably, an emulator according to the present invention emulates a record medium according to the present invention as indicated above.

A first computer program product according to the present invention comprises computer program means embodying the emulator according to the present invention as described above when being executed on a computer, digital signal processor, or the like.

The method for producing a record medium or recording data on a record medium, said record medium comprises different storage areas with respective corresponding latencies, comprises the steps:

determining a respective latency of at least one part of said different storage areas which is altered in respect to said respective corresponding latency, and preparing said record medium so that data is recorded on said record medium with said corresponding latencies in all different storage areas, but said at least one part of said different storage areas, and with said respective altered latency in said at least one part of said different storage areas, and/or recording data on said record medium with said corresponding latencies in all different storage areas, but said at least one part of said different storage areas, and with said respective altered latency in said at least one part of said different storage areas, or by the steps of
- determining a pattern of storage areas with different corresponding latencies for said record medium, which pattern is irregular with respect to the type of record medium
- arranging storage areas with different corresponding latencies in said predetermined pattern on said record medium, and/or.
- recording data on said record medium in said storage areas with different corresponding latencies in said predetermined pattern.

According to the present invention recording is to be understood in the sense of writing a recording medium, e.g. with a CD recorder or writer, or with a control circuit for semiconductor memories, and also in the sense of producing a record medium, e.g. an optical record medium such as a CD or a DVD on basis of an injection moulding process.

In the producing and/or recording method according to the present invention, said preparing step might be performed by recording format information onto said record medium. In this case, said format information might comprise an information in respect to a density of bits to be recorded onto said record medium. Further preferably, said format information is a frequency information written to the pre-grove of the record medium. In this case of a recordable or rewriteable record medium generally two writings are performed for the recording, namely the writing of the pre-grove information which among others indicates the recording density or latency information according to which the relative speed of the second writing, namely the writing of data bits to be recorded, is set, and then the writing of data bits to be recorded. On the other hand, it is also possible to set the relative speed of the writing of data bits independently from the recording density or latency information within the pre-grove information.

Further, in the producing and/or recording method according to the present invention, said recording step might be performed by changing a relative speed of writing data bits and rotating the record medium.

Still further, in the producing and/or recording method according to the present invention, said at least one part of said different storage areas might correspond to a predetermined number of information blocks or bits of said record medium.

A second computer program product according to the present invention comprises computer program means adapted to perform the method as described above when being executed on a computer, digital signal processor, or the like.

The method for verifying a record medium comprising different storage areas with respective corresponding latencies according to the present invention comprises the step of:
- determining whether a respective latency of at least one part of said different storage areas is altered in respect to said respective corresponding latency, or
- determining whether storage areas with different corresponding latencies are arranged in a predetermined pattern on said record medium, which pattern is irregular with respect to the type of record medium.

According to a first preferred embodiment of the verifying method according to the present invention said latency of said at least one part of said different storage areas is preferably directly measured to determine an alteration of the latency or a predetermined pattern of storage areas with different corresponding latencies on said record medium.

According to a second preferred embodiment of the verifying method according to the present invention said alteration of the latency or a predetermined pattern of storage areas with different corresponding latencies on said record medium is preferably determined on basis of a comparison of the measuring results of directly measuring the latency of said at least one part of said different storage areas and/or directly measuring the latency of a storage area with corresponding latency.

Further preferably, according to the second preferred embodiment of the verifying method according to the present invention the following steps are performed:
- a) accessing a first predetermined storage unit of a storage area with first assumed latency,
- b) accessing a second predetermined storage unit of said storage area with first assumed latency which has a predetermined distance to said first predetermined storage unit and access said second storage unit,
- c) measure a first time interval needed for performance of step b),
- d) accessing a third predetermined storage unit of a storage area with second assumed latency,
- e) accessing a fourth predetermined storage unit of said storage area with second assumed latency which has a predetermined distance to said third predetermined storage unit and access said fourth storage unit,
- f) measure a second time interval needed for performance of step e),
- g) determine an alteration of the latency or at least a part of a predetermined pattern of storage areas on basis of a comparison of said first and second time intervals.

In the verifying method according to the present invention, the step of distinguishing proper measurement results from noise is preferably performed on basis of statistical considerations. In particular, sets of statistical latency distributions which are generated based on individual record medium accessing devices and preferably under consideration of individual record media might be accessed to distinguish proper measurement results from measurement noise.

A third computer program product according to the present invention comprises computer program means adapted to perform the verifying method as described above when being executed on a computer, digital signal processor, or the like.

The record medium writing device for writing data onto a record medium comprising different storage areas with respective corresponding latencies according to the present invention comprises recording density variation means
- to alter a respective latency of at least one part of said different storage areas in respect to said respective corresponding latency, or
- to arrange storage areas with different corresponding latencies in a predetermined pattern on said record medium, which pattern is irregular with respect to the type of record medium.

In the record medium writing device according to the present invention, said recording density variation means preferably changes the relative speed of writing data bits and rotating the record medium.

In this case, said recording density variation means might obtain information for changing the relative speed of writing data bits and rotating the record medium from a pre-formatted recording density information or latency information on the record medium.

Alternatively or additionally, said recording density variation means might obtain information for changing the relative speed of writing data bits and rotating the record medium from an external control signal.

The record medium accessing device for accessing data from a record medium comprising different storage areas with respective corresponding latencies according to the present invention comprises in a first embodiment a storage area latency output supplying a respective latency of at least one storage area of an accessed record medium.

Therefore, the first embodiment of the record medium accessing device according to the present invention has—in comparison with prior art devices—an additional output channel providing latency information. The latency information available at this output is used according to the present invention to distinguish a record medium according to the present invention from a conventional record medium which in case of a semiconductor memory might e.g. only comprise uniform latencies or in case of an optical record carrier might have a predictable latency distribution.

The first embodiment of the record medium accessing device according to the present invention preferably comprises a wanted latency input receiving at least one storage area of an accessed record medium of which the corresponding latency should be supplied to said storage area latency output.

Therewith, the first embodiment of the record medium accessing device according to the present invention enables the usage of the record medium verification method set out above which might be realized as a computer program product.

The record medium accessing device for accessing data from a record medium comprising different storage areas with respective corresponding latencies according to the present invention comprises in a second embodiment a record medium verification means
  to determine whether a respective latency of at least one part of said different storage areas is altered in respect to said respective corresponding latency, or
  to determine whether storage areas with different corresponding latencies are arranged in a predetermined pattern on said record medium, which pattern is irregular with respect to the type of record medium.

Therefore, the second embodiment of the record medium accessing device according to the present invention does not necessarily need a latency output channel, since the verification of a record medium is directly performed.

The record medium verification means which is directly implemented in the second embodiment of the record medium accessing device according to the present invention is preferably able to perform all method steps as defined in the verification method set out above and might also be realized as a computer program product.

Figure 2:
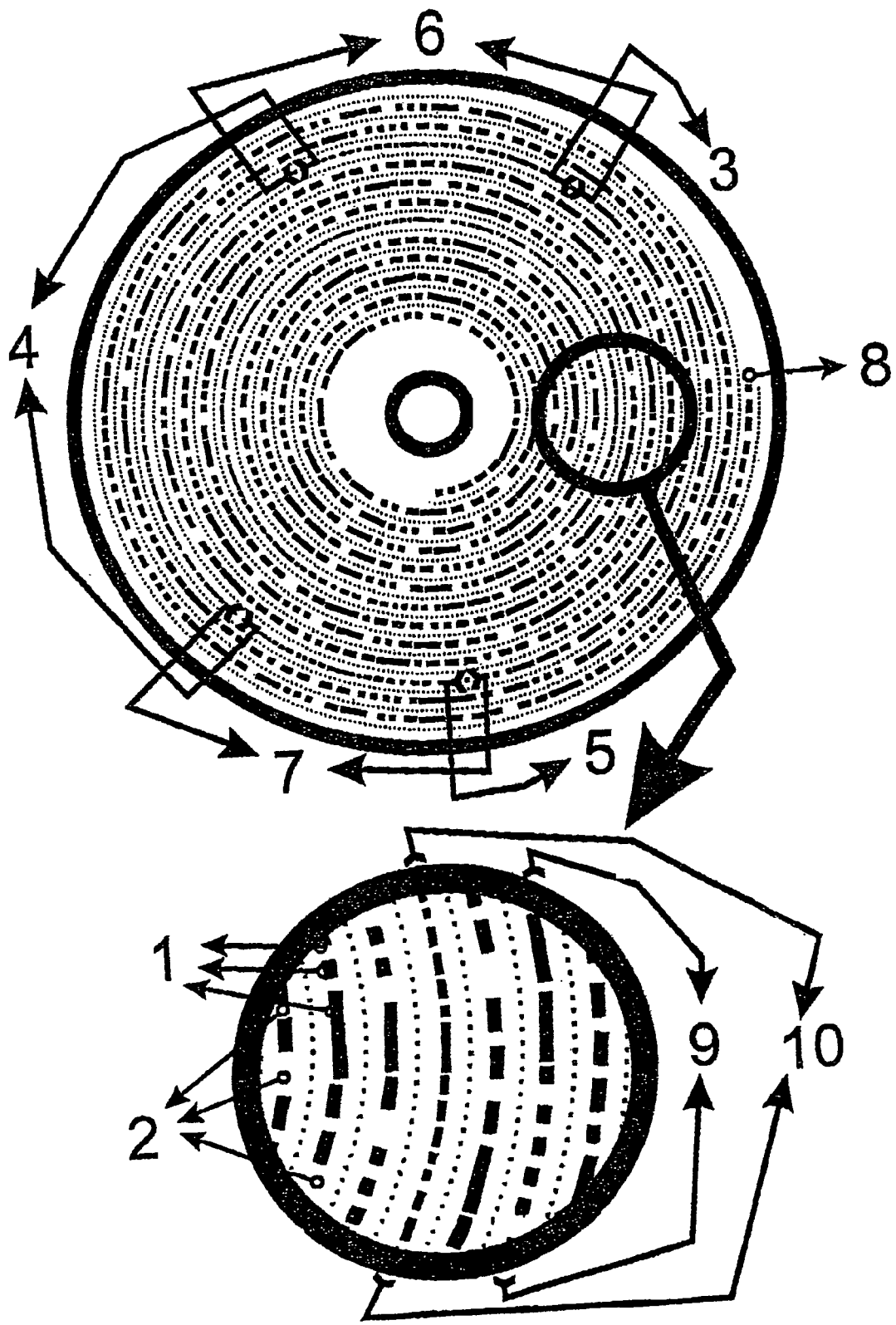
Figure 3:
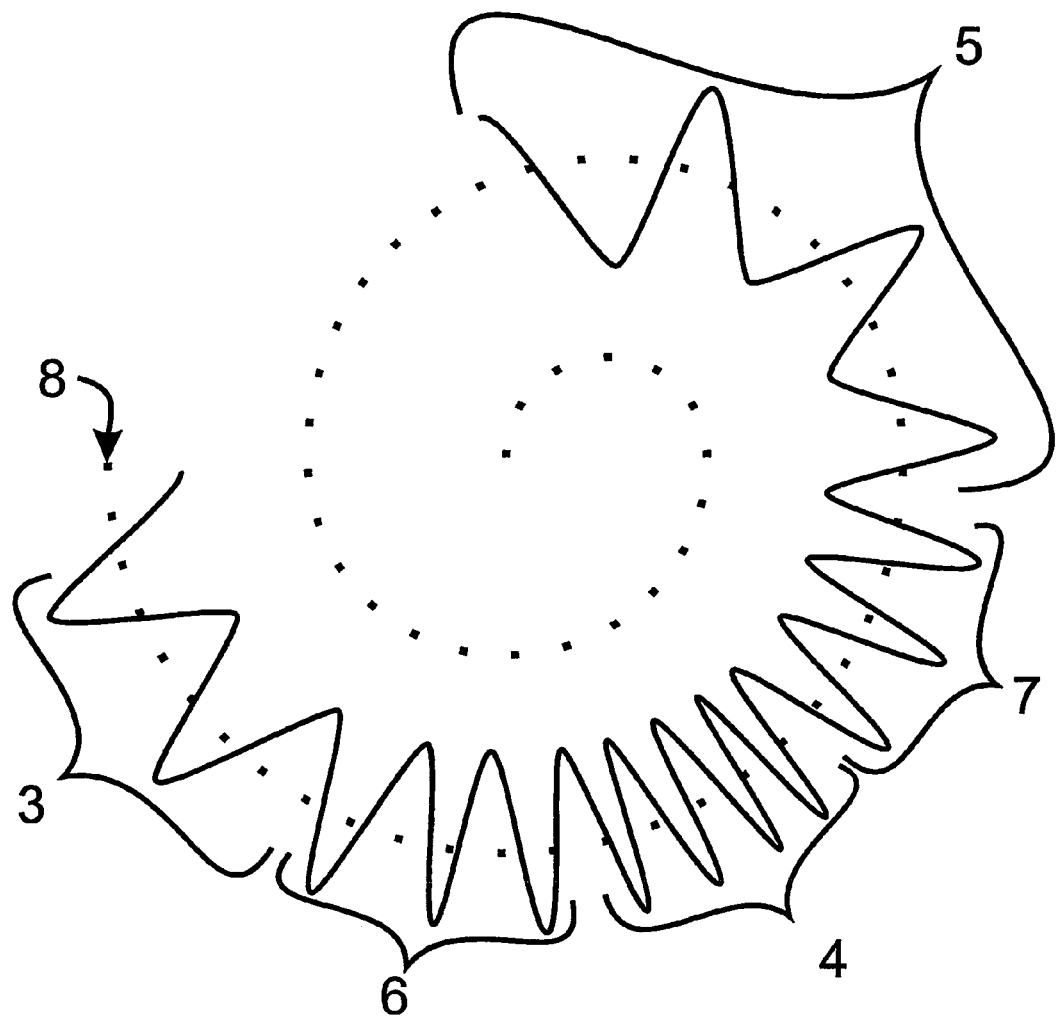
Figure 4:
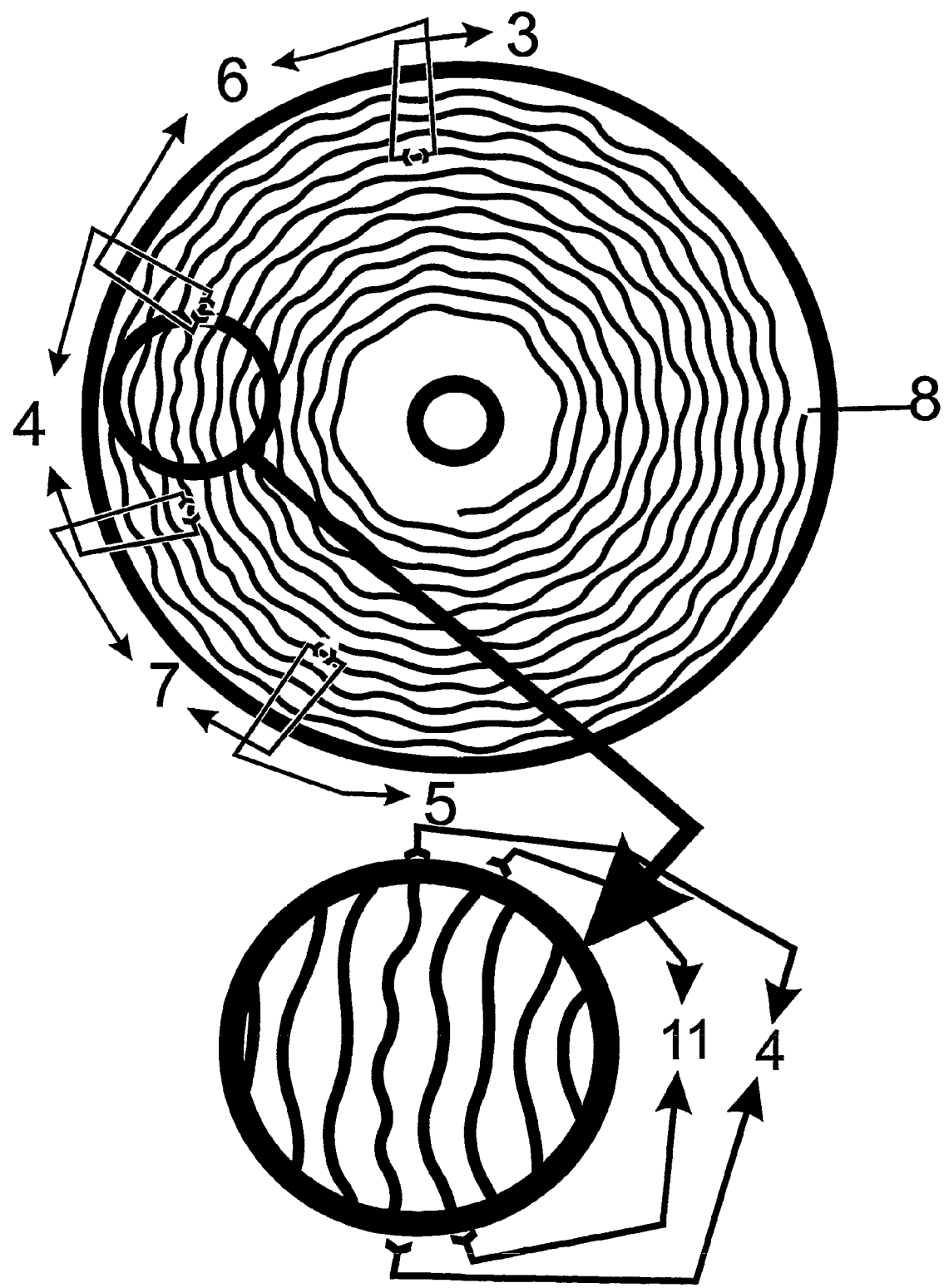
Figure 5A:
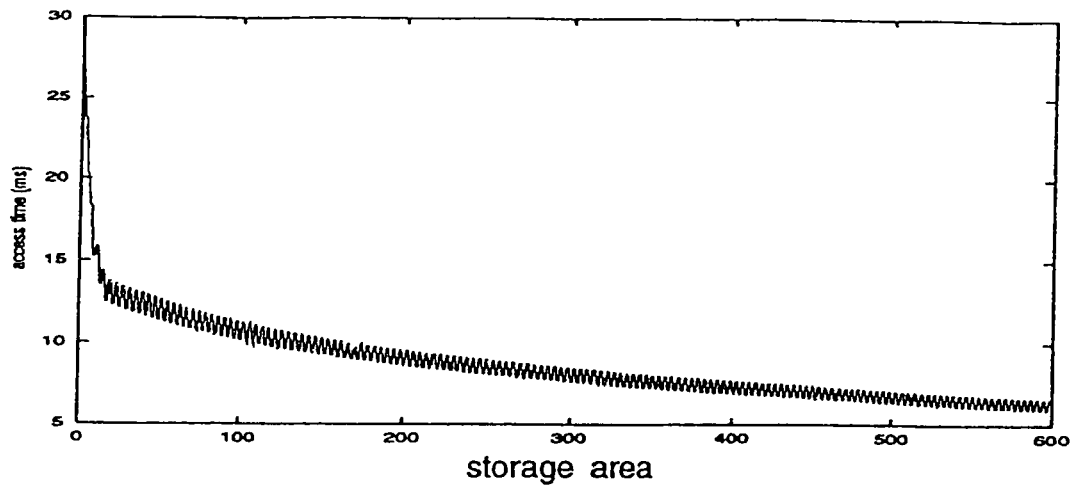
Figure 5B:
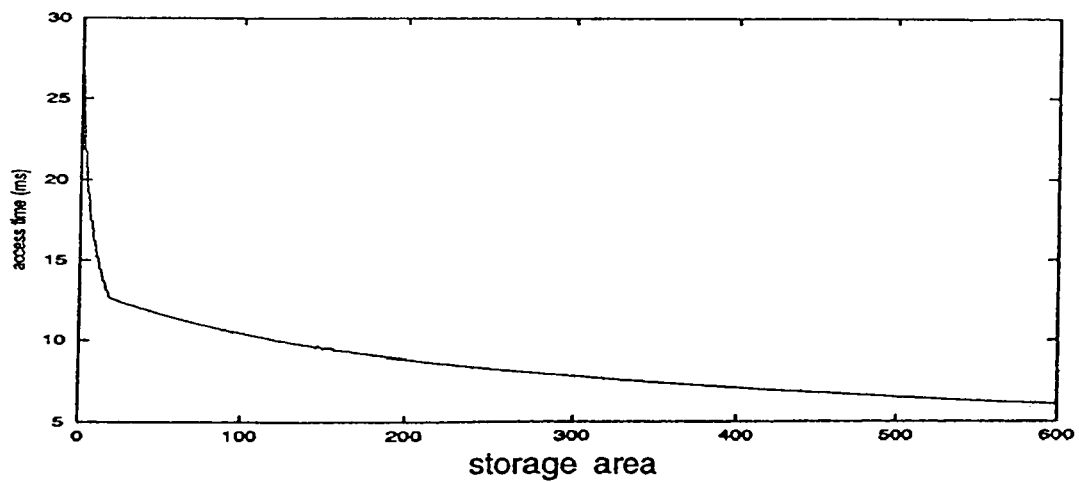
Figure 6A:
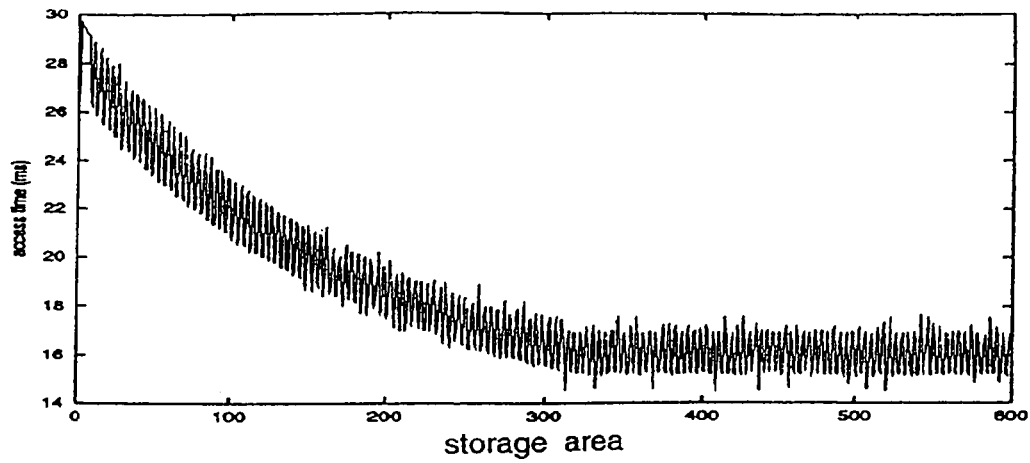
Figure 6B:
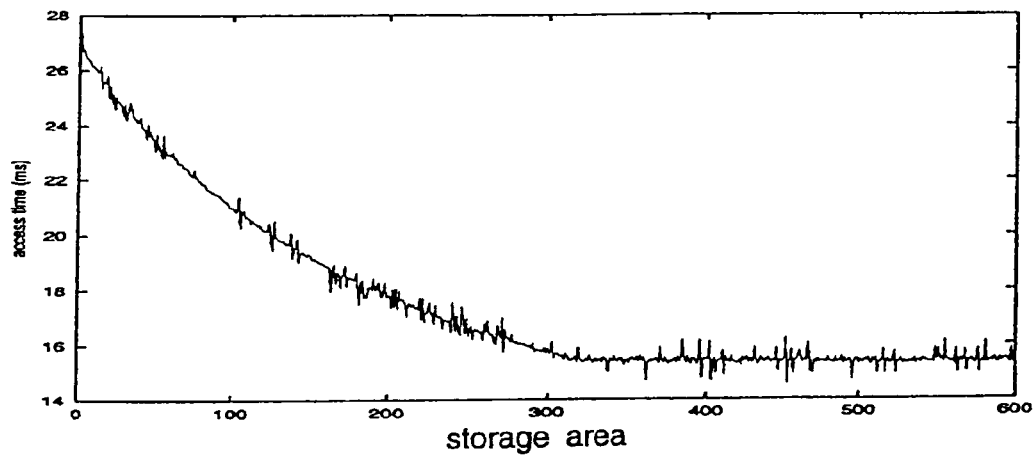
Figure 7A:
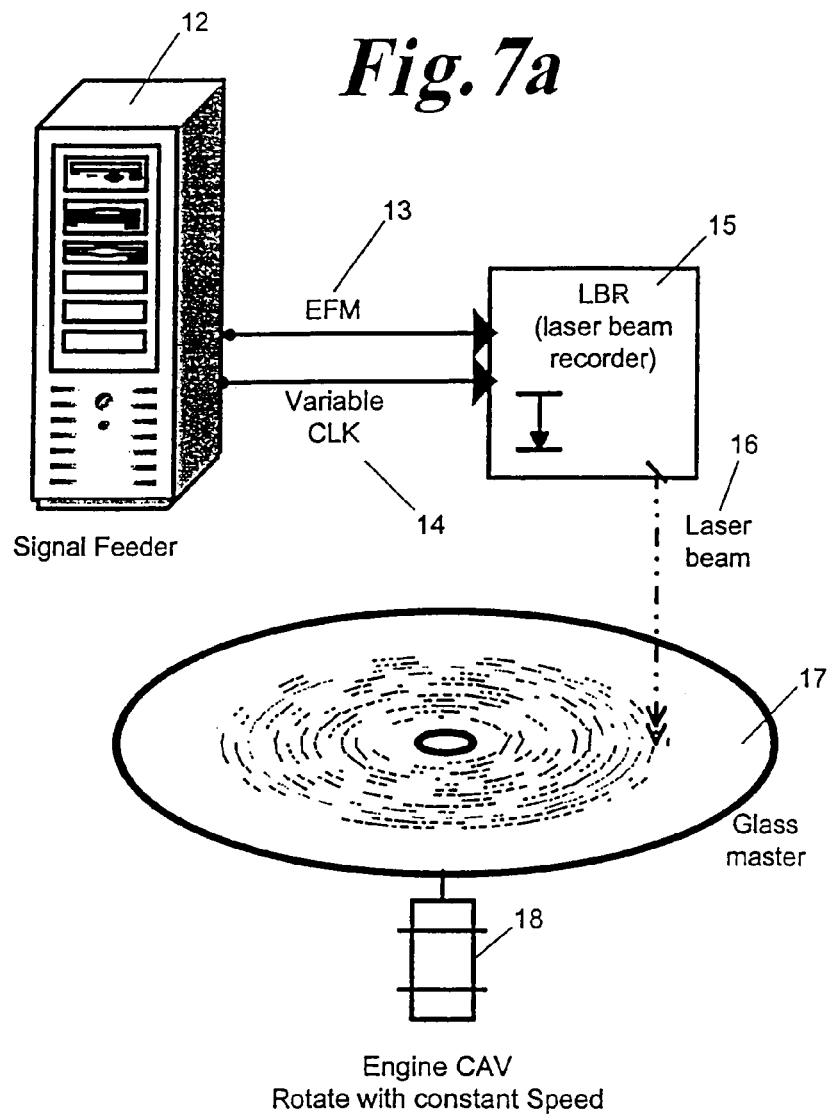
Figure 7B:
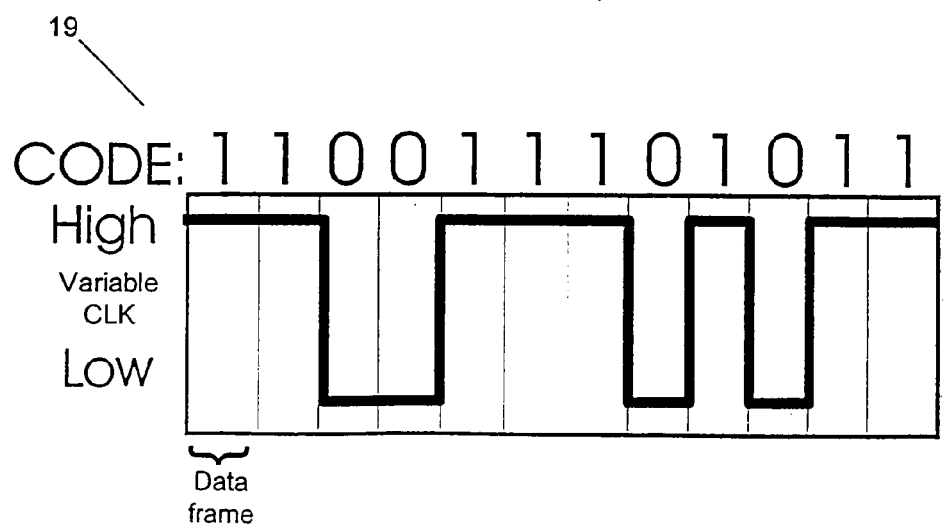

The accompanying figures, which are incorporated in and constitute a part of this specification, illustrate exemplary embodiments of the invention and, together with a general description of the invention given above, and the detailed description of the embodiment given below, serve to explain the principles of the invention, wherein:

FIG. 1 shows a principle view of pits and lands of neighbouring storage areas of a CD according to a first preferred exemplary embodiment of the present invention, FIG. 2 shows a more realistic view of the pits and lands of the CD shown in FIG. 1, FIG. 3 shows a principle view of recording density information pre-formatted as pre-grove information on a CD-R according to a second preferred exemplary embodiment of the present invention, FIG. 4 shows a more realistic view of the recording density information pre-formatted as pre-grove information on the CD-R shown in FIG. 2, FIGS. 5A and 5B show statistical latency distributions for a first exemplary CD-ROM accessing device, FIGS. 6A and 6B show latencies and a set of statistical latency distributions for a second exemplary CD-ROM accessing device, FIGS. 7A and 7B show a functional diagram of an exemplary record medium writing device for producing record media with different latencies.

Figure 8:
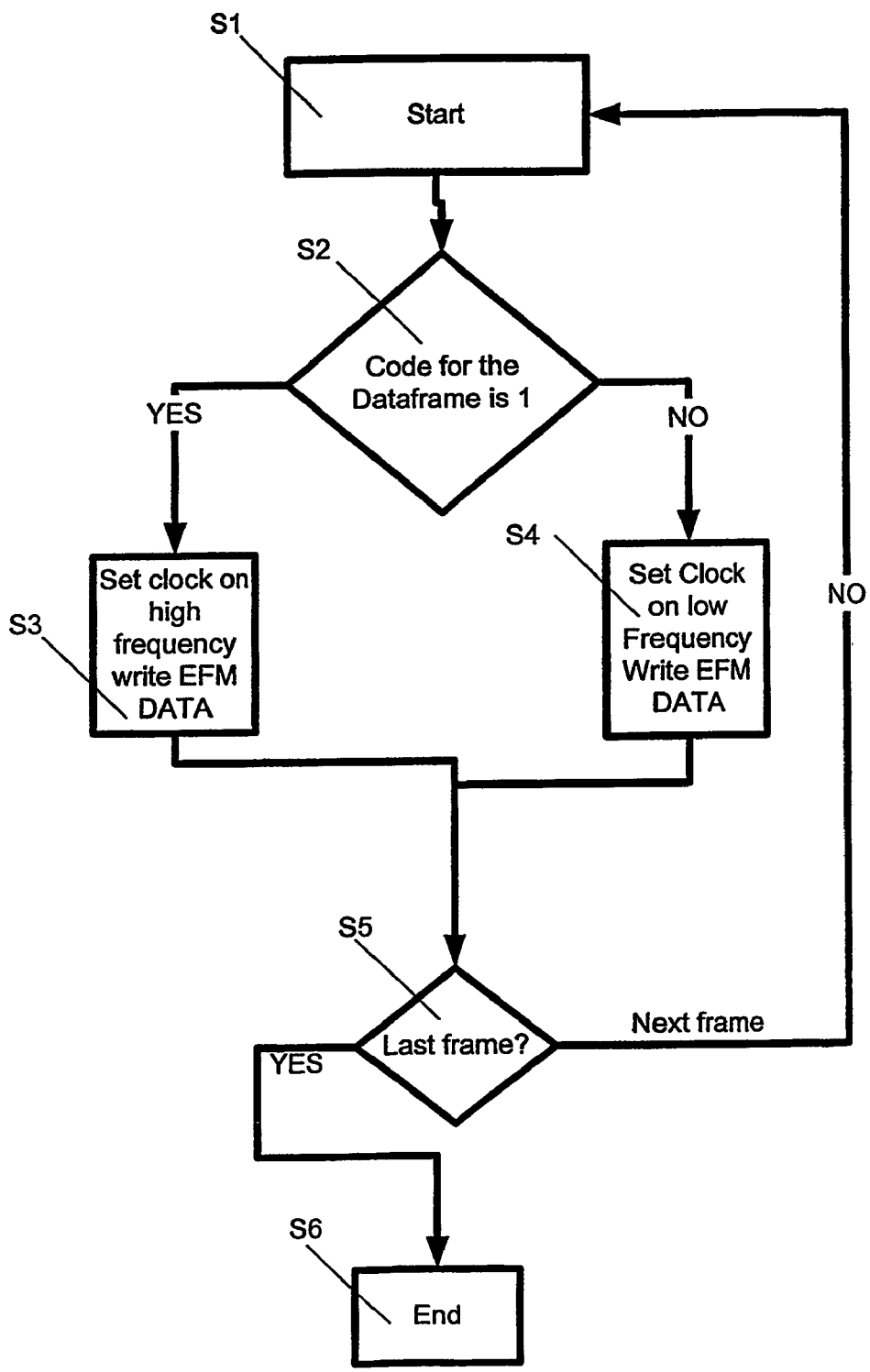
Figure 9A:
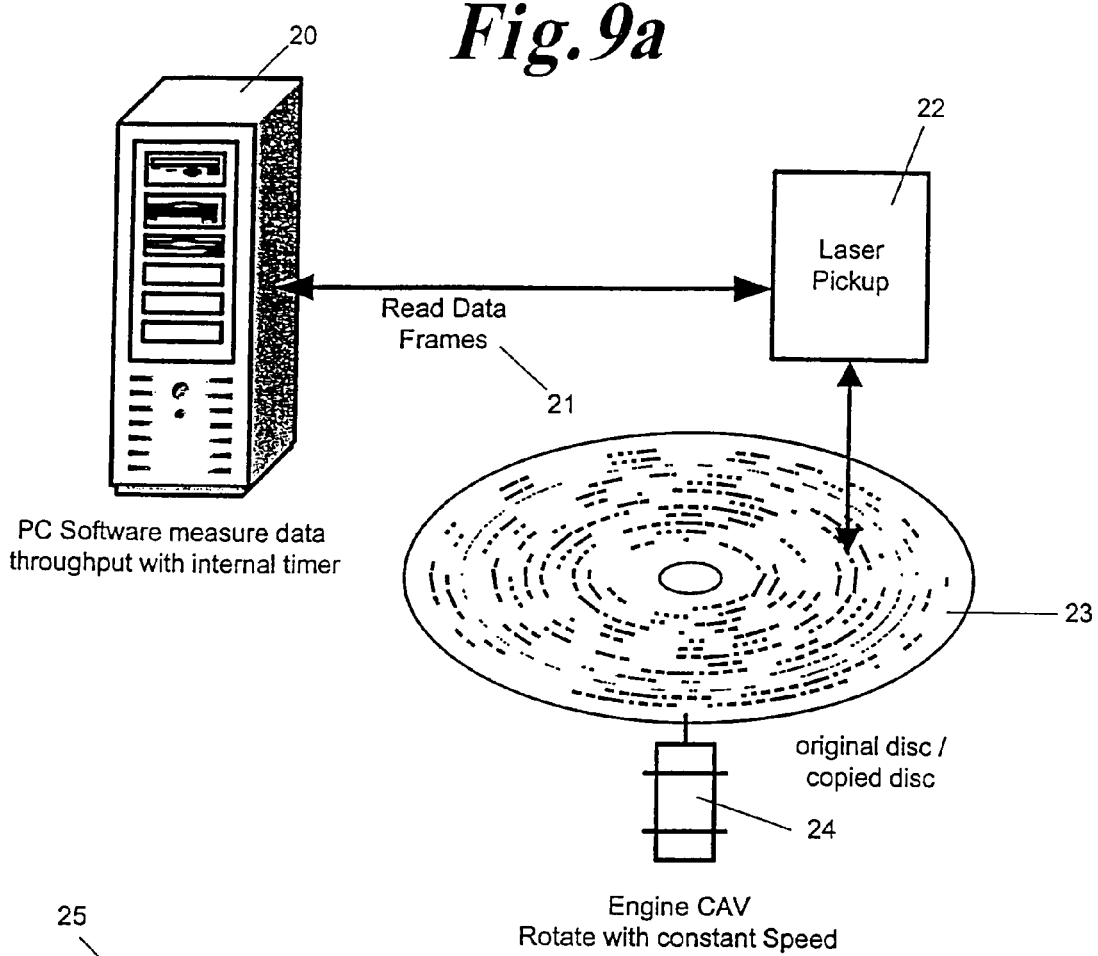
Figure 9B:
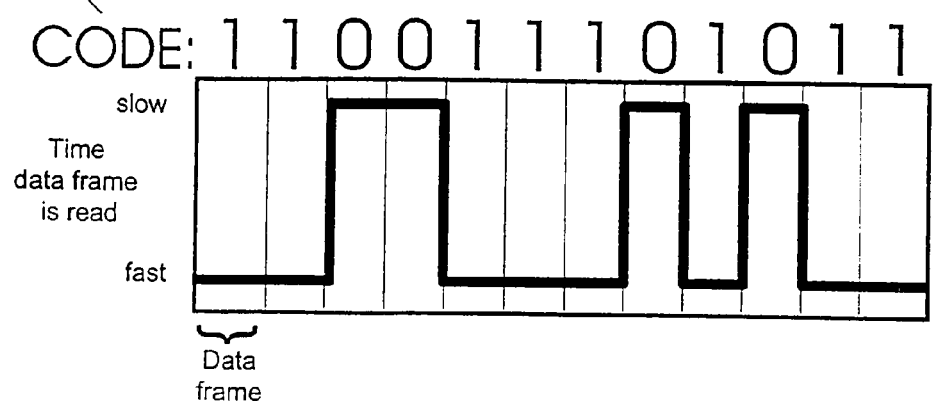
Figure 10:
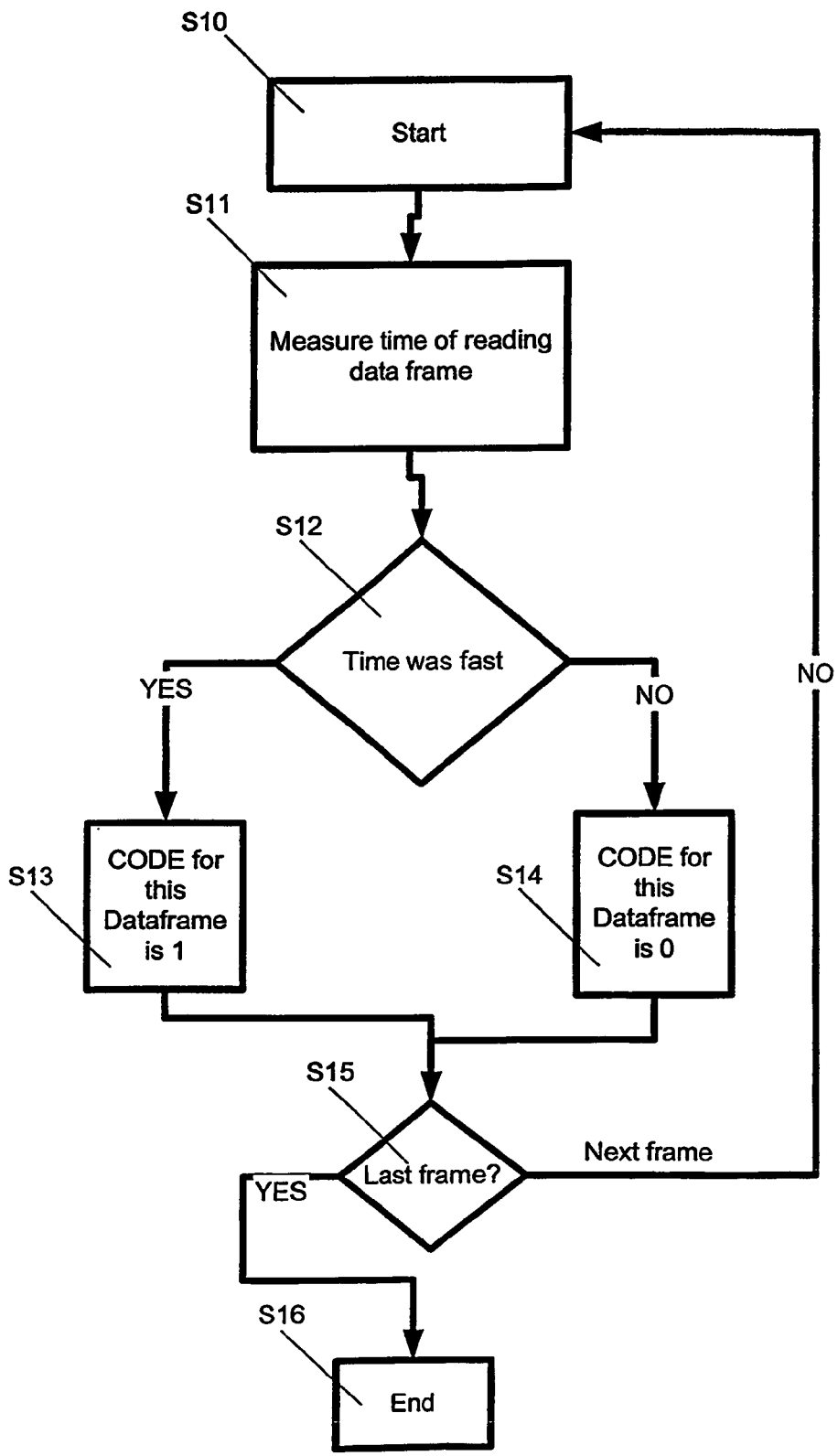
Figure 11:
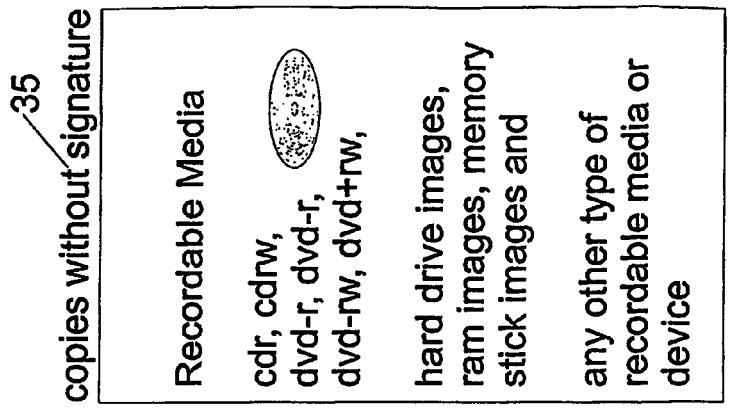
Figure 11:
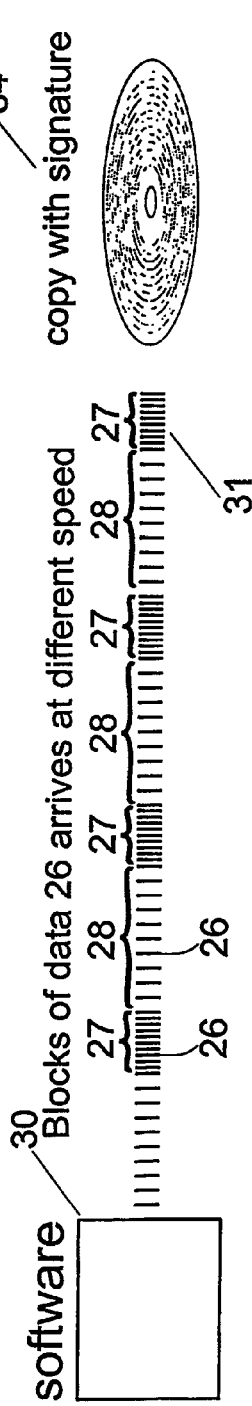
Figure 11:
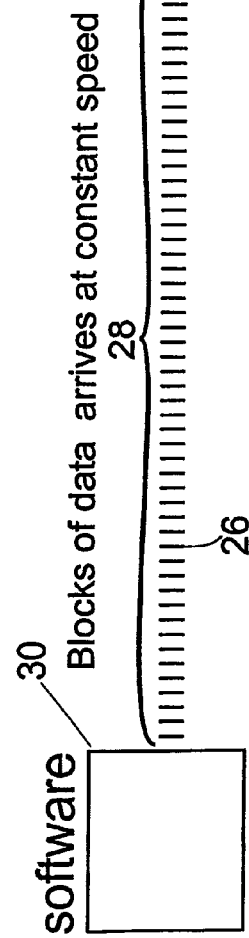

FIG. 8 shows a flowchart of an exemplary procedure to set different latencies executed in a signal feeder of the record medium writing device according to FIG. 7, FIGS. 9A and 9B show a functional diagram of an exemplary record medium verifying device for record media with different latencies, FIG. 10 shows a flowchart of an exemplary procedure to verify different latencies executed in a processor of the record medium verifying device according to FIG. 9, and FIG. 11 shows a principle view of an emulator or emulator software emulating the different latencies of a record medium according to the present invention.

FIG. 1 principally shows pits 1 and lands 2 of neighbouring storage areas along a track 8 of a CD, namely the arrangement of pits 1 and lands 2 within a first storage area 3, the arrangement of pits 1 and lands 2 within a second storage area 4, and the arrangement of pits 1 and lands 2 within a third storage area 5. The first storage area 3 shows a normal, i.e. corresponding, latency for the respective position on a CD, the second storage area 4 shows an altered, here a shortened latency for the respective position on a CD, and the third storage area 5 again shows a normal, i.e. corresponding, latency for the respective position on a CD. No pits and lands are indicated in the transition regions between the storage areas.

FIG. 2 shows a more realistic view of the pits and lands of the CD shown in FIG. 1, since real data is depicted in principle. The top part shows a view corresponding to that of FIG. 1 and the bottom part shows a partial enlargement of the CD shown in the top part.

A first transition region 6 is arranged between the first storage area 3 which shows the normal, i.e. corresponding, latency for the respective position on a CD and the second storage area 4 which shows the shortened latency for the respective position on a CD. The pits 1 and lands 2 in the first transition area 6 slowly adapt from the recording density and expansion of those in the first storage area 3 to the recording density and expansion of those in the second storage area 4. A second transition region 7 is arranged between the second storage area 4 which shows the shortened latency for the respective position on a CD and the third storage area 5 which shows the normal, i.e. corresponding, latency for the respective position on a CD. The pits 1 and lands 2 in the second transition area 7 slowly adapt from the recording density and expansion of those in the second storage area 4 to the recording density and expansion of those in the third storage area 5.

In the partial enlargement of the CD shown in the top part, a fourth storage area 9 with normal, i.e. corresponding, latency for the respective position on a CD and a fifth storage area 10 with shortened latency for the respective position on a CD are shown. In this partial enlargement the higher recording density and smaller expansions of pits and lands in the fifth storage area 10 in comparison to the normal, i.e. corresponding, recording density and expansions of pits and lands in the fourth storage area 9 are clearly visible.

The latencies are derivable from the density with which the pits and lands are formed and from their respective expansion. In case the single bits of information are written to the CD in a shorter time than usual, i.e. the density of pits and land is higher and their expansion is shorter than usual, a predetermined memory block or sector of the CD is accessed in a shorter time than usual.

In case the accessing device very quickly perform a self-synchronization to the more dense and less expanded pits and lands, the latency might be a corresponding latency, i.e. similar to the latency of a corresponding CD sector which latency is not altered, but the "change of latency" is derivable from the change of rotation speed of the disc drive. In other words, according to the present invention the relative latency is considered, i.e. the relation of latency in respect to rotation speed.

Normally, as is elucidated below, neighbouring storage areas of a CD show only slight variations in respect to their latencies. However, since according to the present invention, as shown in the first preferred exemplary embodiment thereof, an alteration of a normally corresponding latency is recognizable, the original record medium can be distinguished from a copy thereof, since the altered latencies, e.g. realized on basis of line speed variations, get lost with today available CD-Recorders and CD-Recordables due to the fact that these recorders determine the latency on basis of information pre-formatted to the record medium, e.g. pre-formatted line speed information in the pre-grove of a CD-R.

One record medium according to the present invention might have several alterations of the latency, e.g. the line speed of a CD. The change of line speed according to the present invention is preferably analyzed and gets then preferably decoded to a bit-pattern. This bit-pattern might be used as a key which can be used to verify if the record medium is an original or a copy, and/or the key can be used to decrypt the data retrieved from the disc in case the data was encrypted with the key before recording. This encryption/decryption technique is possible, since the key is known before recording. The before referenced EP 0 899 733 also discloses different schemes of securing data on a record medium with a key which are applicable to this invention.

Since a recordable or rewriteable record medium according to the further aspect of the present invention comprises e.g. pre-grove information indicating a varied line speed, recording devices automatically adapt to the varying line speed indicated in the pre-grove and data to be recorded can be secured based on the pre-grove information which is known before the writing or recording process.

The line speed information comprised in the pre-grove information of a recordable or rewriteable CD or DVD is in principle shown in FIG. 3 corresponding to the exemplary CD shown in FIG. 1. The pre-grove information indicates the position of the track 8 along which the data is to be recorded and based on a frequency "wobbled" onto the track position also the line speed information.

FIG. 3 shows that the frequency is low in the first storage area 3, then slowly increases in a first transition area 6 to be high in the second storage area 4. Following, the frequency slowly decreases in a second transition area 7 to be low again in the third storage area 5. The intermediate portions of first transition area 6 and second transition area 7 of slow increasing or decreasing frequency are preferably inserted between low and high frequency to enable a smooth tracking of the recording device.

FIG. 4 shows a more realistic view of recordable or rewriteable CD or DVD which is in principle shown in FIG. 3, since real data is depicted in principle. The top part shows a view corresponding to that of FIG. 3 and the bottom part shows a partial enlargement of the recordable or rewriteable CD or DVD shown in the top part.

Corresponding to FIGS. 2 and 3, the frequency wobbled onto the track position in the first transition area 6 slowly adapts from that in the first storage area 3 to that in the second storage area 4, and the frequency wobbled onto the track position in the second transition area 7 slowly adapts from that in the second storage area 4 to that in the third storage area 5.

In the partial enlargement of the recordable or rewriteable CD or DVD shown in the top part, a sixth storage area 11 with pre-formatted information for normal, i.e. corresponding, latency for the respective position on a CD and a part of the second storage area 4 with pre-formatted information for shortened latency for the respective position on a CD are shown. In this partial enlargement the higher frequency in the second storage area 4 in comparison to the normal, i.e. corresponding, frequency in the sixth storage area 11 are clearly visible.

For read-only optical record media, the latency information, e.g. the line speed variation, is set during the mastering process.

Of course, not only two different frequencies might be used, as indicated above by low frequency and high frequency, but a higher number of frequencies might be chosen to enable a higher coding of line speeds, i.e. latency information. Further, as indicated above, also the distribution of the latency information of the whole record medium or parts thereof might be used to provide a key embossed in an original record carrier.

FIG. 5a shows the distribution of latencies of a CD-ROM according to the present invention, i.e. with varying latencies, read out with a first CD-ROM accessing device over the first 600 storage areas. The latencies are alternated from slightly faster than usual to slightly slower than usual over the whole shown 600 storage areas. The usual, i.e. normally corresponding, latencies are depicted in FIG. 5b. The curve shown in FIG. 5b might also serve as set of statistical latency distributions for the first CD-ROM accessing device to distinguish proper measurement results from measurement noise.

As can be seen in the case of the first CD-ROM accessing device, the normal, i.e. corresponding, latencies shown in FIG. 5b are represented by a rather smooth curve and the latencies alternated according to the present invention shown in FIG. 5a basically follow this curve, but clearly deviate therefrom to be slightly shorter or longer.

FIG. 6a shows the measurement results of a comparable example using the same CD-ROM as in the example of FIG. 5a with a second CD-ROM accessing device. It is clearly derivable that the latency varies over a wider range, but as in the foregoing example, a clear distinction of different latencies is possible. FIG. 6b shows similarly as FIG. 5b the usual, i.e. normally corresponding, latencies, but in this case for the second CD-ROM accessing device. Here a more noisy curve is obtained which might also serve as set of statistical latency distributions for the second CD-ROM accessing device to distinguish proper measurement results from measurement noise.

Based on the respective set of statistical latency distributions the altered latency of a specific sector might be derived on basis of a direct latency measurement.

Alternatively, an alteration of the latency might be determined based on a comparison of latencies of a latency of a sector with altered latency and of a sector with normally, i.e. corresponding, latency. Under assumption that each sector comprises several frames, in this case preferably a first time interval is measured indicating the time starting after a predetermined first frame of the sector with altered latency is accessed and ending after a predetermined second frame of the sector with altered latency is accessed, which second frame has a predetermined distance to the first frame. Further, a second time interval is measured indicating the time starting after a predetermined first frame of the sector with normal, i.e. corresponding, latency is accessed and ending after a predetermined second frame of the sector with normal, i.e. corresponding, latency is accessed, which second frame has the same predetermined distance to the first frame as in case of the sector with altered latency. Based on a comparison of both time intervals, the alteration of the access time can be determined. Of course, the comparison must not be based on a normal, i.e. corresponding, latency, but also different altered latencies can be compared.

As indicated in the general portion of the specification, apart from the above described record media and recordable or rewriteable record media, the invention is also directed to an emulator for record media which might work based on a copy of an original record medium and the additional information in respect to the latencies thereof, a method for producing record media according to the present invention as indicated above, a method for verifying record media as indicated above, a record medium writing device for producing record media as indicated above, and a record medium accessing device for verifying recordable or non-recordable record media.

As described in the general portion of the specification, the first embodiment of the record medium accessing device according to the present invention has an additional output channel providing latency information. The curves shown in FIGS. 5A, 5B, 6A, and 6B might be regarded as latency information available at this output.

FIG. 7A shows a functional diagram of an exemplary record medium writing device for producing record media with different latencies according to the present invention. A signal feeder 12 supplies an EFM signal 13 as signal to be recorded and a variable clock signal 14 to a laser beam recorder 15. The laser beam recorder 15 emits a laser beam 16 onto a glass master 17 that is rotated with a constant angular velocity by a recorder engine 18. The laser beam 16 Is modulated according to the EFM signal 13 and the variable clock signal 14 to record pits and lands corresponding to the EFM signal 13 in relation to the variable clock signal 14 onto the glass master 17, i.e. the variable clock signal 14 determines the length of each respective bit of the recorded EFM signal 13 on the glass master 17. In case the variable clock signal 14 has a higher than usual frequency for a corresponding recording position, the recorded pits and lands will be shortened in respect to their usual length in said position and in case the variable clock signal 14 has a lower than usual frequency for a corresponding recording position, the recorded pits and lands will be lengthened in respect to their usual length in said position.

As shown in FIG. 7B, a writing code 19 within the signal feeder determines a high or low variable clock frequency in the shown exemplary record medium writing device. In the shown example each bit of the writing code 19 determines the deviation of the clock frequency from the normal clock frequency within one particular data frame to be recorded. A high variable clock frequency that might be indicated by a logical 1 within the writing code 19 might correspond to a slightly faster latency and a low variable clock frequency that might be indicated by a logical 0 within the writing code 19 might be a slightly slower latency, e.g. latencies corresponding to the example indicated in FIGS. 5A, 5B, 6A, and 6B. Therefore, according to the exemplary shown part of the writing code 19 with the bit pattern "110011101011", e.g. following data frames are recorded so that two data frames show a slightly higher latency, the next two data frames show a slightly lower latency, the next three data frames show a slightly higher latency, the following data frame shows a slightly lower latency, the next data frame shows a slightly higher latency, the following data frame shows a slightly lower latency, and the last two data frames show a slightly higher latency.

FIG. 8 shows a flowchart of an exemplary procedure to set different latencies executed in the signal feeder 12 of the record medium writing device according to FIG. 7A. The procedure starts in a first step S1. Thereafter, in a second step S2 it is verified whether or not the writing code for the next to be written data frame is logical 1. In case the writing code 19 for the data frame is logical 1, i.e. the verification result is positive, a third step S3 is performed in which the clock is set to the high frequency corresponding to the slightly higher latency with which the EFM data should be written. In case the writing code 19 for the data frame is logical 0, i.e. the verification result is negative, a fourth step S4 is performed in which the clock is set to the low frequency corresponding to the slightly lower latency with which the EFM data should be written. After the third step S3 or the fourth step S4 have been performed, it is checked in a fifth step S5 whether or not the last frame was processed. In case the last frame was processed, the procedure continues with a sixth step S6 in which it terminates. In case not the last frame was processed, i.e. a next frame is to be processed, the procedure resumes the first step S1.

FIG. 9A shows a functional diagram of an exemplary record medium verifying device for record media with different latencies according to the present invention. A reader engine 24 rotates an original or copied optical disc 23 with a constant angular velocity. A laser pickup 22 reads the data, i.e. the recorded EFM signal, from the disc 23 and supplies the read data frames 21 to an evaluation unit 20. e.g. as in this embodiment a PC with software to measure the data throughput with an internal timer. The evaluating device 20 determines the code corresponding to a data frame based on the time that is needed to read the EFM signal corresponding to one data frame, i.e. the time needed to receive the data frame by the evaluating device 20. In case the data frame was read faster than usual, a logical 1 is assigned to the data frame by appending a logical 1 to a reading code 28. In case the data frame was read slower than usual, a logical 0 is assigned to the data frame by appending a logical 0 to the reading code 25, as shown in FIG. 9B. After the whole code is determined, i.e. all storage areas determined for the code are read, the evaluating device 20 can compare the resulting code with a code used to record the corresponding original record carrier to determine if the read disc is an original disc or a copied disc.

According to the exemplary shown part of the reading code 19 with the bit pattern "110011101011", e.g. following data frames are read that two data frames show a slightly faster reading time, the next two data frames show a slightly slower reading time, the next three data frames show a slightly faster reading time, the following data frame shows a slightly slower reading time, the next data frame shows a slightly faster reading time, the following data frame shows a slightly slower reading time, and the last two data frames show a slightly faster reading time.

FIG. 10 shows a flowchart of an exemplary procedure to verify different latencies executed in a processor of the record medium verifying device according to FIG. 9A. The verification procedure starts in a tenth step S10. Thereafter, in a eleventh step S11 the time needed to read a data frame is determined. In a following twelfth step S12 it is verified whether or not the time to read the data frame was fast. In case the time to read the data frame was fast, i.e. the verification result is positive, a thirteenth step S13 is performed in which the reading code for this data frame is set to logical 1. In case the time to read the data frame was not fast, i.e. the verification result is negative, a fourteenth step S14 is performed in which the reading code for this data frame is set to logical 0. After the thirteenth step S13 or the fourteenth step S14 have been performed, it is checked in a fifteenth step S15 whether or not the last frame was processed. In case the last frame was processed, the procedure continues with a sixteenth step S16 in which it terminates. In case not the last frame was processed, i.e. a next frame is to be processed, the procedure resumes the tenth step S10.

Of course, the writing code 19 and/or the reading code 25 might not only relate to succeeding data frames, but also to data frames of any other predetermined pattern on the record medium, as described above. Such a pattern and/or the respective latencies for the data frames determined by the pattern might also be recorded onto the record medium by the record medium writing device. Then the record medium verifying device could read this information to perform the verification by only accessing the predetermined data frames.

Further, it is possible that more than two different latencies are used to protect an original record medium. Also, the exemplary used slightly higher and slightly lower than usual latency is not mandatory. It is of course also possible to use the normal and a deviating latency.

FIG. 11 shows a principle view of an emulator or emulator software emulating the different latencies of a record medium according to the present invention e.g. when accessing a copy thereof that does not show the different latencies.

In particular, the upper part of FIG. 11 shows on the right hand side a copy 34 of a record medium according to the present invention with a signature based on different latencies, i.e. which copy 34 also shows the signature according to the present invention. When a reading is performed from the copy 34 with signature, the corresponding blocks of data 26 arrive at a verification means 30 with a varying speed. In the shown example there exist in an alternating way first areas 28 with a first time distance between two blocks of data 26, e.g. a 'normal' time distance, and second areas 27 with a second time distance between two blocks of data 26 that is shortened in comparison to the first time distance, i.e. two consecutive blocks of data 26 within the second areas 27 arrive at the verification means 30 within a shorter period than two consecutive blocks of data 26 within the first areas 28.

The verification means 30 might be a software or a hardware realization that determines whether a respective latency of at least one part of said different storage areas is altered in respect to said 'normal' latency, or whether storage areas with different corresponding latencies are arranged in a predetermined pattern on said record medium, which pattern is irregular with respect to the type of record medium. It might be that the verification means 30 knows the latencies of every storage area or at least predetermined storage areas on the recording medium e.g. from a data base or from the recording medium itself, e.g. from a special table included on the recording medium, and then simply compares these latencies to the speed with which the read blocks of data 26 arrive. In case of an arriving speed corresponding to the latency stored in the table for the respective corresponding storage area, an original is verified and access will be granted. In case of a mismatch between arriving speed and stored latency, an illegal copy is detected and access is denied. In a very simple verification means 30 e.g. only a latency variation might be detected to determine an original and grant the access. Since the blocks of data 26 in the upper part of FIG. 11 arrive at different speed at the verification means 30, in this case directly determined by the varying reading speed with which the copy 34 with signature was read, the verification means grants the access to the data on the recording medium.

The middle and lower part of FIG. 11 show the access of a recording medium that carries a copy 35 without the signature, i.e. that does not show varying latencies. Such copies 35 without signature might be generated by copying the data of an original onto a CDR, CDRW, DVD-R, DVD+R, DVD-RW, DVD+RW, on a hard drive, into RAM or Memory Stick or any other type of recordable media or devices. Also an access of the data via a network is possible.

In the middle part of FIG. 11 the blocks of data 26 arrive with constant speed at the verification means 30, in this case with a speed corresponding to that of the first areas 28 of the upper part of FIG. 11 with a first time distance between two blocks of data 26. Since the blocks of data 26 in the middle part of FIG. 11 do not arrive at different speed at the verification means 30, in this case directly determined by the constant reading speed with which the copy 35 without signature was read, the verification means denies the access to the data on the recording medium.

In the lower part of FIG. 11 the blocks of data 26 are also read with a constant speed from the copy 35 without the signature, as in the middle part of FIG. 11. However, before the blocks of data 26 are fed to the verification means 30, they arrive with constant speed at an emulator 29. The emulator 29 generates the signature according to the present invention so that the corresponding blocks of data 26 arrive at a verification means 30 with a varying speed corresponding to that of the original, e.g. corresponding to the first areas 28 and second areas 27 as shown in the upper part of FIG. 11. Therefore, since the blocks of data 26 in the lower part of FIG. 11 arrive at different speeds at the verification means 30 that correspond to the different speeds of the corresponding original, e.g. the copy 34 with signature, in this case determined by the emulator 29, the verification means grants the access to the data on the recording medium.

The emulator 29 might be a software or a hardware realization that determines the respective latencies of every storage area or at least predetermined storage areas on the recording medium e.g. from a data base or from the recording medium itself, e.g. from a special table included on the recording medium, and then adapts these latencies to the speed with which the read blocks of data 26 are output from the emulator 29 and arrive at the verification means 30.

Further, as also described in the general portion of the specification, the present invention is not only applicable to the before described optical or magneto-optical recording media which preferably rotate and alter the latency on basis of a line speed variation, but also other storage media which latencies might be altered are applicable to the present invention. E.g. the content of certain "memory cells" of a hard disc or semiconductor memories might be delayed by a predetermined amount, or arrays of semiconductor memories might be build on basis of memory structures with different latencies. This technique is in particular useful for removable memories, like a memory card for a video play console, a Memory Stick™, or a chip card e.g. for the health insurance data. In such cases each individual chip card could have its own unique identifier based on the number of used different latencies and the number of memory cells used for the coding according to the present invention. Also, the emulator according to the present invention might not only emulate different latencies of optical or magneto-optical recording media which preferably rotate, but also of the above mentioned or further storage media.

The invention claimed is:

1. An optical or magneto-optical recording medium, comprising:

different memory blocks with respective corresponding latencies, the different memory blocks having bits arranged with respective corresponding densities according to the respective corresponding latencies, wherein latency is a waiting time from the request of data to the receiving of the requested data in relation to a rotation speed for receiving of the requested data, wherein a respective latency of at least one part of said different memory blocks is altered in respect to a respective corresponding normally used latency of a respective position on said record carrier, wherein when said at least one part of said different memory blocks has a shorter latency, the bits are arranged in a higher density, and when said at least one part of said different memory blocks has a longer latency, the bits are arranged in a lower density than a normally used density of bits for said at least one part of said different memory blocks; and memory blocks with different corresponding latencies are arranged in a predetermined pattern on said optical or magneto-optical recording medium, wherein within said predetermined pattern at least one memory block with a first latency is situated between at least two memory blocks with latencies that are longer than said first latency.

2. The optical or magneto-optical recording medium according to claim 1, wherein said corresponding normally used latencies are determined based on the density of the bits written in said memory blocks.

3. The optical or magneto-optical recording medium according to claim 1, wherein said shorter and longer latencies are achieved based on line speed variations.

4. The optical or magneto-optical recording medium according to claim 1, wherein said optical or magneto-optical recording medium is one of a read-only recording medium, a recordable recording medium, and a rewriteable recording medium.

5. The optical or magneto-optical recording medium according to claim 1, wherein a pre-formatted recording density information or latency information is provided which indicates memory blocks with respective corresponding nominal latencies on said recording medium and which indicates at least one part of one of said memory blocks with a respective altered latency in respect to said respective corresponding normally used latency for the respective position on said recording medium.

6. The optical or magneto-optical recording medium according to claim 5, wherein said pre-formatted recording density information or latency information is frequency information written to the pre-groove of the recording medium.

7. An emulator for a non-original optical or magneto-optical recording medium, wherein the non-original optical or magneto-optical recording medium comprises different memory blocks with corresponding latencies for corresponding positions on the non-original recording medium, and wherein at least one latency of said different memory blocks varies from a corresponding at least one latency of said different memory blocks of an original optical or magneto-optical recording medium, wherein latency is the waiting time from the request of data to the receiving of the requested data in relation to a rotation speed for receiving of the requested data, the emulator configured to receive data read from the non-original recording medium and to emulate said corresponding at least one latency of said different memory blocks of said original optical or magneto-optical recording medium by outputting different emulator memory blocks so that at least one respective latency of at least one part of said different emulator memory blocks output by the emulator corresponds to said corresponding at least one latency of said different memory blocks of said original recording medium, wherein said corresponding at least one latency of the different memory blocks of the original optical or magneto-optical recording medium is emulated such that memory blocks with different corresponding latencies are arranged in a predetermined pattern, wherein within said predetermined pattern at least one memory block with a first latency is situated between at least two memory blocks with latencies that are longer than said first latency.

8. A computer readable storage medium storing computer program instructions which, when executed by a processor, cause the processor to function as an emulator for a non-original optical or magneto-optical recording medium, wherein the non-original optical or magneto-optical recording medium comprises different memory blocks with corresponding latencies for corresponding positions on the non-original recording medium, and wherein at least one latency of said different memory blocks varies from a corresponding at least one latency of said different memory blocks of an original optical or magneto-optical recording medium, wherein latency is the waiting time from the request of data to the receiving of the requested data in relation to a rotation speed for receiving of the requested data, the emulator configured to receive data read from the non-original recording medium and to emulate said corresponding at least one latency of said different memory blocks of said original optical or magneto-optical recording medium by outputting different emulator memory blocks so that at least one respective latency of at least one part of said different emulator memory blocks output by the emulator corresponds to said corresponding at least one latency of said different memory blocks of said original recording medium, wherein said corresponding at least one latency of the different memory blocks of the original optical or magneto-optical recording medium is emulated such that memory blocks with different corresponding latencies are arranged in a predetermined pattern, wherein within said predetermined pattern at least one memory block with a first latency is situated between at least two memory blocks with latencies that are longer than said first latency.

9. An optical or magneto-optical recording medium writing device for writing data onto an optical or magneto-optical recording medium comprising different memory blocks with respective corresponding latencies, the different memory blocks having bits arranged with respective corresponding densities according to the respective corresponding latencies, wherein latency is the waiting time from the request of data to the receiving of the requested data in relation to a rotation speed for receiving of the requested data, the writing device comprising:

a recording density variation unit configured to alter a respective latency of at least one part of said different memory blocks in respect to a respective corresponding normally used latency for the respective position on the recording medium, wherein said recording density variation unit is configured to change the relative speed of writing data bits and rotating the recording medium, wherein when said at least one part of said different memory blocks has a shorter latency, the bits are arranged in a higher density, and when said at least one part of said different memory blocks has a shorter latency, the bits are arranged in a lower density than a normally used density of bits for said at least one part of said different memory blocks; and said recording density variation unit is configured to arrange memory blocks with different latencies in a predetermined pattern on said optical or magneto-optical recording medium, wherein within said predetermined pattern at least one memory block with a first latency is situated between at least two memory blocks with latencies that are longer than said first latency.

10. The optical or magneto-optical recording medium writing device according to claim 9, wherein said recording density variation unit obtains information for changing the relative speed of writing data bits and rotating the recording medium from a pre-formatted recording density information or latency information on the recording medium.

11. The optical or magneto-optical recording medium writing device according to claim 9, wherein said recording density variation unit obtains information for changing the relative speed of writing data bits and rotating the recording medium from an external control signal.

12. A recording medium accessing device for accessing data from an optical or magneto-optical recording medium comprising different memory blocks with respective corresponding latencies, the different memory blocks having bits arranged with respective corresponding densities according to the respective corresponding latencies, wherein latency is the waiting time from the request of data to the receiving of the requested data in relation to a rotation speed for receiving of the requested data, the accessing device comprising:

a recording medium verification unit configured to determine whether a respective latency of at least one part of said different memory blocks is altered in respect to a respective corresponding normally used latency for the position on the recording medium, wherein when said at least one part of said different memory blocks has a shorter latency, the bits are arranged in a higher density, and when said at least one part of said different memory blocks has a longer latency, the bits are arranged in a lower density than a normally used density of bits for said at least one part of said different memory blocks, and wherein the recording medium verification unit is configured to determine whether memory blocks with different corresponding latencies are arranged in a predetermined pattern on said optical or magneto-optical recording medium, wherein within said predetermined pattern at least one memory block with a first latency is situated between at least two memory blocks with latencies that are longer than said first latency.

* * * * *